US010536641B2

(12) United States Patent
Gotoh et al.

(10) Patent No.: US 10,536,641 B2
(45) Date of Patent: Jan. 14, 2020

(54) DISPLAY SYSTEM, DISPLAY APPARATUS, AND IMAGE PROCESSING APPARATUS

(71) Applicant: Japan Display Inc., Tokyo (JP)

(72) Inventors: Fumitaka Gotoh, Tokyo (JP); Tsutomu Harada, Tokyo (JP)

(73) Assignee: Japan Display Inc., Tokyo (JP)

(*) Notice: Subject to any disclaimer, the term of this patent is extended or adjusted under 35 U.S.C. 154(b) by 73 days.

(21) Appl. No.: 15/819,169

(22) Filed: Nov. 21, 2017

(65) Prior Publication Data

US 2018/0097997 A1 Apr. 5, 2018

Related U.S. Application Data

(63) Continuation of application No. PCT/JP2016/065512, filed on May 25, 2016.

(30) Foreign Application Priority Data

May 28, 2015 (JP) .................... 2015-109023

(51) Int. Cl.
  *H04N 5/228* (2006.01)
  *H04N 5/232* (2006.01)
  (Continued)

(52) U.S. Cl.
  CPC .......... *H04N 5/23267* (2013.01); *B60R 1/00* (2013.01); *H04N 5/23258* (2013.01); *H04N 7/185* (2013.01); *B60R 2300/306* (2013.01)

(58) Field of Classification Search
  CPC ................................................ H04N 5/228
  (Continued)

(56) References Cited

U.S. PATENT DOCUMENTS

2011/0298936 A1* 12/2011 Watanabe .......... H04N 5/23219
  348/208.4

FOREIGN PATENT DOCUMENTS

JP 2004-301789 A 10/2004
JP 2007-235532 A 9/2007
  (Continued)

OTHER PUBLICATIONS

International Search Report; International Application No. PCT/JP2016/065512; Filing Date: May 25, 2016.
  (Continued)

*Primary Examiner* — Anand S Rao
(74) *Attorney, Agent, or Firm* — Michael Best & Friedrich LLP

(57) ABSTRACT

A display system includes an imaging apparatus installed on a mobile body; a display apparatus installed at a position different from that of the imaging apparatus on the mobile body and displaying a post-processing image; a first sensor detecting vibration at or near the imaging apparatus; a second sensor detecting vibration at or near the display apparatus; a first image processor clipping out a preprocessing image from an image captured by the imaging apparatus, based on the first sensor detection result; and a second image processor clipping out the post-processing image from the preprocessing image based on the second sensor detection result. The first image processor moves a clip-out region of the preprocessing image in a direction to counteract vibration at or near the imaging apparatus, and the second image processor causes a clip-out region of the post-processing image to follow vibration at or near the display apparatus.

11 Claims, 12 Drawing Sheets

(51) Int. Cl.
  *B60R 1/00*     (2006.01)
  *H04N 7/18*     (2006.01)
(58) Field of Classification Search
  USPC .................................. 348/142–160, 112–119
  See application file for complete search history.

(56) References Cited

FOREIGN PATENT DOCUMENTS

| JP | 2009-093076 A | 4/2009 |
| JP | 2010-268520 A | 11/2010 |
| JP | 2013-150153 A | 8/2013 |
| JP | 2014-026046 A | 2/2014 |

OTHER PUBLICATIONS

Japanese Office Action for corresponding Japanese Patent Application No. 2017-520791 dated Jan. 8, 2019.

\* cited by examiner

DISPLAY SYSTEM, DISPLAY APPARATUS, AND IMAGE PROCESSING APPARATUS

CROSS-REFERENCE TO RELATED APPLICATIONS

This application is a continuation of International Application No. PCT/JP2016/065512, filed on May 25, 2016 which claims the benefit of priority of the prior Japanese Patent Application No. 2015-109023, filed on May 28, 2015, the entire contents of which are incorporated herein by reference.

BACKGROUND

1. Technical Field

The present invention relates to a display system, a display apparatus, and an image processing apparatus.

2. Description of the Related Art

In recent years, a display system that includes an imaging apparatus and a display apparatus installed on a mobile body such as a vehicle has been known. This display system is configured such that an image captured by the imaging apparatus can be displayed on the display apparatus.

The mobile body vibrates along with movement thereof. Due to such movement, blurring of the image occurs, making it difficult to recognize what is being displayed on the display apparatus. As a configuration to reduce effects of such vibration, in-vehicle imaging apparatuses that reduce the effects of the vibration that occurs while capturing an image have been known, as described in Japanese Patent Application Laid-open Publication No. 2013-150153 and Japanese Patent Application Laid-open Publication No. 2010-268520, for example.

However, the imaging apparatus and the display apparatus that are both installed on the mobile body and are located at different positions separately vibrate at the respective locations. Because of this, it has not been possible, by the image stabilization alone, to reduce the blurring of the image due to the vibration exerted on the display apparatus.

For the foregoing reasons, there is a need for a display system, a display apparatus, and an image processing apparatus capable of allowing an image to be visually recognized in a state of having reduced blurring of the image, the blurring being due to respective vibrations exerted on an imaging apparatus and a display apparatus installed on a mobile body. Alternatively, there is a need for a display system, a display apparatus, and an image processing apparatus capable of reducing blurring of an image, the blurring being due to vibration exerted on the display apparatus that is installed on a mobile body on which the imaging apparatus is installed.

SUMMARY

According to an aspect, a display system includes: an imaging apparatus installed on a mobile body and including an imaging device that captures an image; a display apparatus installed at a position different from that of the imaging apparatus on the mobile body and including a display device configured to display a post-processing image based on the image captured by the imaging apparatus; a first sensor configured to detect vibration at or near the imaging apparatus; a second sensor configured to detect vibration at or near the display apparatus; a first image processor configured to, based on a detection result of the first sensor, clip out a preprocessing image to be smaller than the captured image from the captured image; and a second image processor configured to, based on a detection result of the second sensor, clip out the post-processing image to be smaller than the preprocessing image from the preprocessing image. The first image processor moves a clip-out region of the preprocessing image within the captured image in a direction to counteract vibration at or near the imaging apparatus. The second image processor causes a clip-out region of the post-processing image within the preprocessing image to follow vibration at or near the display apparatus.

According to another aspect, a display apparatus is installed on a mobile body, on which an imaging apparatus including an imaging device configured to capture an image is installed, at a position different from that of the imaging apparatus. The display apparatus includes: a display device configured to display a post-processing image based on the image captured by the imaging apparatus; and an image processor configured to clip out a preprocessing image to be smaller than the captured image from the captured image based on a detection result of a first sensor configured to detect vibration at or near the imaging apparatus, and clip out the post-processing image to be smaller than the preprocessing image from the preprocessing image based on a detection result of a second sensor configured to detect vibration at or near the display apparatus. The image processor moves a clip-out region of the preprocessing image within the captured image in a direction to counteract vibration at or near the imaging apparatus, and causes a clip-out region of the post-processing image within the preprocessing image to follow vibration at or near the display apparatus.

According to still another aspect, an image processing apparatus is configured to perform image processing for a mobile body on which an imaging apparatus and a display apparatus are installed, the imaging apparatus including an imaging device configured to capture an image, the display apparatus being installed at a position different from that of the imaging apparatus and including a display device configured to display a post-processing image based on the image captured by the imaging apparatus. The image processing apparatus includes: an image processor configured to clip out a preprocessing image to be smaller than the captured image from the captured image based on a detection result of a first sensor configured to detect vibration at or near the imaging apparatus, and clip out the post-processing image to be smaller than the preprocessing image from the preprocessing image based on a detection result of a second sensor configured to detect vibration at or near the display apparatus. The image processor moves a clip-out region of the preprocessing image within the captured image in a direction to counteract vibration at or near the imaging apparatus, and causes a clip-out region of the post-processing image within the preprocessing image to follow vibration at or near the display apparatus.

According to still another aspect, a display apparatus is installed on a mobile body, on which an imaging apparatus including an imaging device configured to capture an image is installed, at a position different from that of the imaging apparatus. The display apparatus includes: a display device configured to display a post-processing image based on the image captured by the imaging apparatus; and an image processor configured to, based on a detection result of a sensor configured to detect vibration at or near the display apparatus, clip out the post-processing image to be smaller than a preprocessing image from the preprocessing image that is generated based on the captured image and for which influence of vibration at or near the imaging apparatus has been reduced. The image processor causes a clip-out region of the post-processing image within the preprocessing image to follow vibration at or near the display apparatus.

According to still another aspect, an image processing apparatus is configured to perform image processing for a mobile body on which an imaging apparatus and a display apparatus are installed, the imaging apparatus including an imaging device configured to capture an image, and the display apparatus being installed at a position different from that of the imaging apparatus and including a display device configured to display a post-processing image based on the image captured by the imaging apparatus. The image processing apparatus includes: an image processor configured to, based on a detection result of a sensor configured to detect vibration at or near the display apparatus, clip out the post-processing image to be smaller than a preprocessing image from the preprocessing image that is generated based on the captured image and for which influence of vibration at or near the imaging apparatus has been reduced. The image processor causes a clip-out region of the post-processing image within the preprocessing image to follow vibration at or near the display apparatus.

DETAILED DESCRIPTION

The following describes an embodiment of the present invention with reference to the accompanying drawings. Note that the disclosure is a mere example in any case, and appropriate modifications retaining the spirit of the present invention that those skilled in the art can easily perceive are naturally included within the scope of the invention. Although the drawings may be schematically illustrated in terms of width, thickness, shape, and others of various portions as compared with the actual forms in order to further clarify the explanation, the drawings are examples and are not intended to limit the interpretation of the invention. In the description and the drawings, elements the same as those of the previously described drawings are given the corresponding identical reference signs and their detailed explanations may be omitted as appropriate.

In this disclosure, when an element is described as being "on" another element, the element can be directly on the other element, or there can be one or more elements between the element and the other element.

Embodiment

Figure 1:
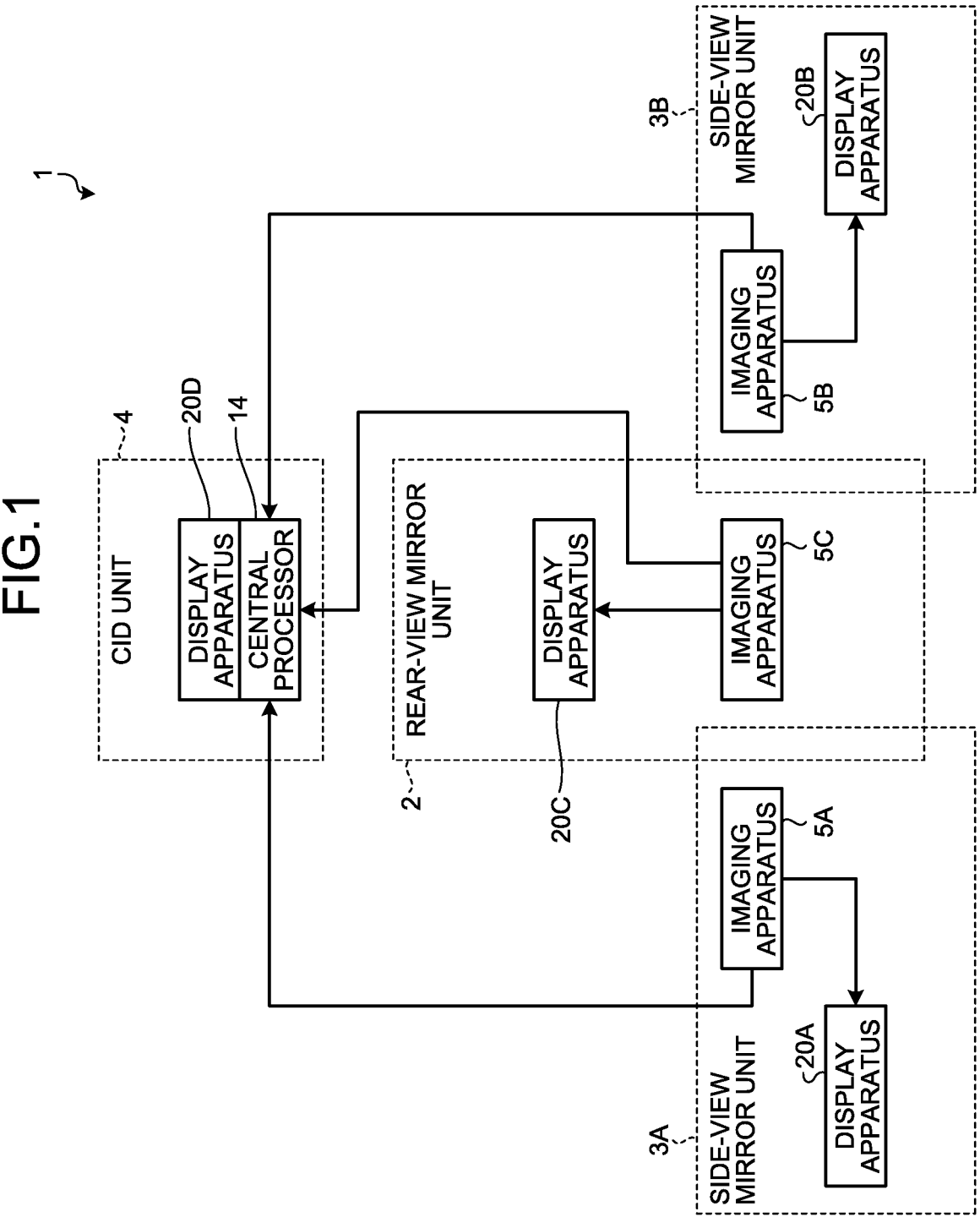
FIG. 1 is a diagram illustrating a main configuration of a display system according to an embodiment of the present invention.

FIG. 1 is a diagram illustrating a main configuration of a display system 1 according to an embodiment of the present invention. As illustrated in FIG. 1, the display system 1 includes a rear-view mirror unit 2, two side-view mirror units 3A and 3B, and a center information display (CID) unit 4. The display system 1 is an in-vehicle display system installed on a mobile body such as a vehicle. A vehicle in the following description is an example of the mobile body.

Figure 2:
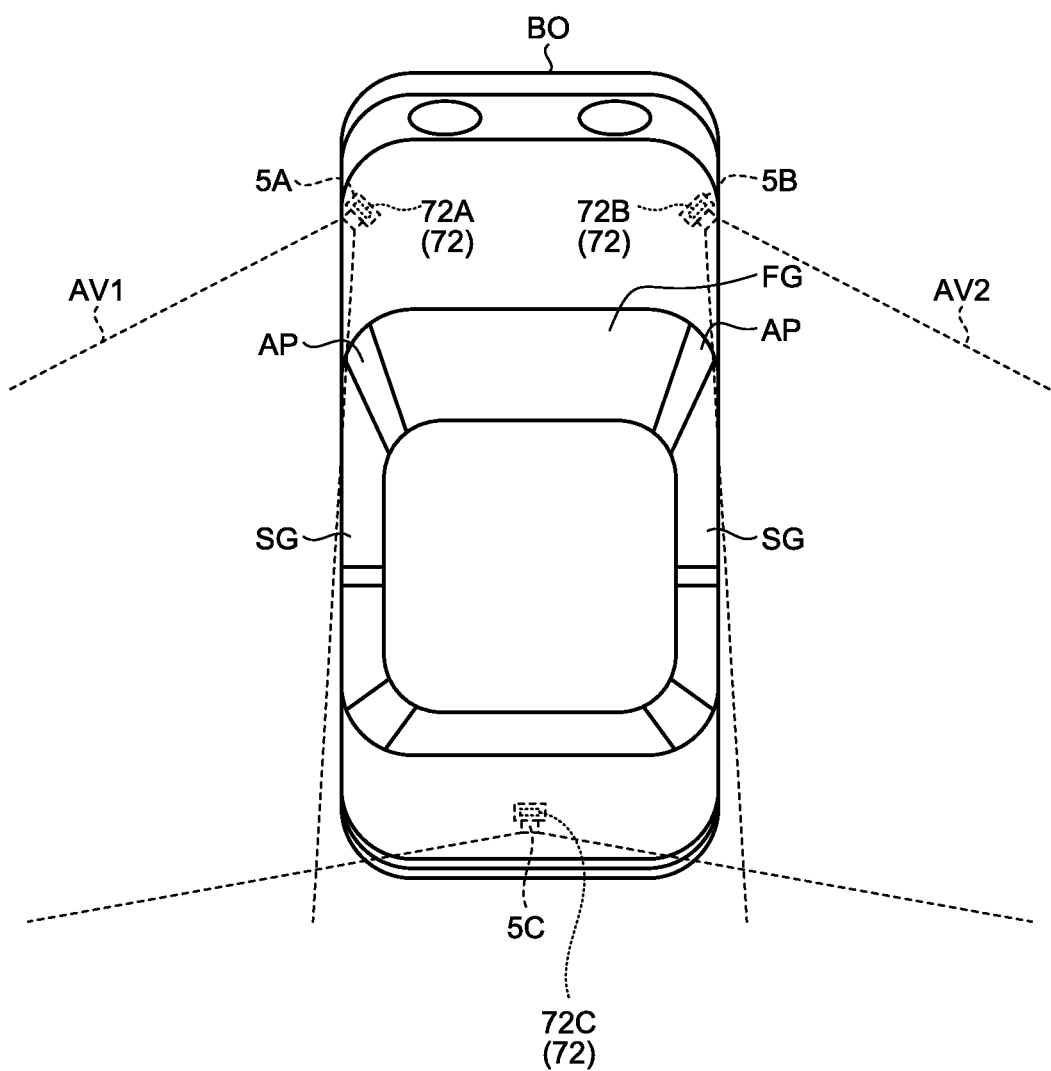
FIG. 2 is a diagram illustrating an arrangement example of imaging apparatuses included in a rear-view mirror unit and side-view mirror units.

FIG. 2 is a diagram illustrating an arrangement example of imaging apparatuses 5A and 5B included in the respective side-view mirror units 3A and 3B and an imaging apparatus 5C included in the rear-view mirror unit 2. In FIG. 2, the angles of view of the imaging apparatuses 5A, 5B, and 5C are indicated by broken lines. For example, as illustrated in FIG. 2, the display system 1 includes three imaging apparatuses 5A, 5B, and 5C. The three imaging apparatuses 5A, 5B, and 5C are arranged at the sides of and the rear of a vehicle body BO of the vehicle, respectively. Each of the three imaging apparatuses 5A, 5B, and 5C has an imaging device 71 (refer to FIG. 5). The imaging device 71 includes a lens, an image sensor, and others. The image sensor is provided so as to be able to detect the external light via the lens. The angles of view of the respective imaging devices 71 included in the three imaging apparatuses 5A, 5B, and 5C are directed toward the outside of the vehicle. That is, the three imaging apparatuses 5A, 5B, and 5C capture images with which the conditions outside the vehicle can be checked. More specifically, the imaging apparatuses 5A and 5B are installed at the corresponding sides of the vehicle body. The imaging apparatus 5C is installed at the rear of the vehicle body. The angles of view of these imaging apparatuses 5A, 5B, and 5C partially overlap with one another. Accordingly, imaging regions of the three imaging apparatuses 5A, 5B, and 5C can cover the rearward area of the angles of view AV1 and AV2. In the embodiment, display apparatuses 20A and 20B display images captured by the imaging apparatuses 5A and 5B, respectively; a display apparatus 20C displays an image captured by the imaging apparatus 5C. When the imaging apparatuses 5A, 5B, and 5C are not distinguished specifically, they may be described as the imaging apparatus 5. When the display apparatuses 20A, 20B, and 20C and a later-described display apparatus 20D are not distinguished specifically, they may be described as the display apparatus 20.

The display system 1 further includes first sensors 72 configured to detect vibration at or near the corresponding imaging apparatuses 5. Specifically, as illustrated in FIG. 2, first sensors 72A, 72B, and 72C are individually provided inside housings of the respective imaging apparatuses 5A, 5B, and 5C. When the first sensors 72A, 72B, and 72C are not distinguished specifically, they may be described as the first sensors 72.

Figure 3:
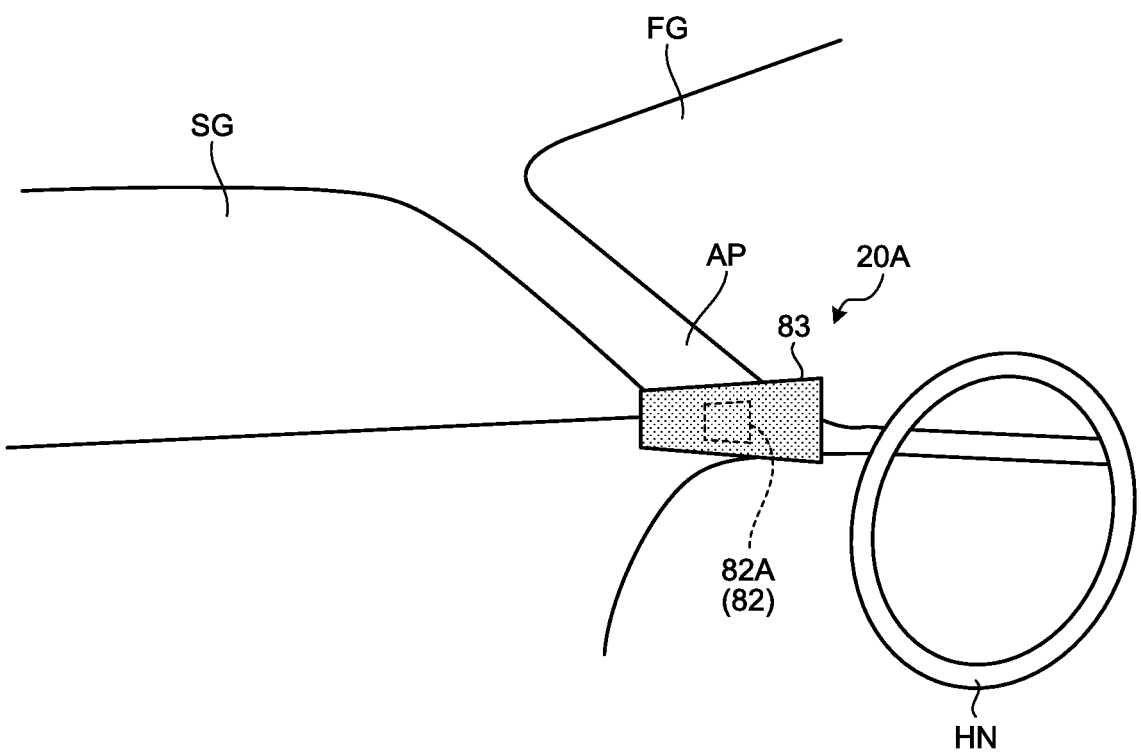
FIG. 3 is a diagram illustrating an arrangement example of a display apparatus included in the side-view mirror unit.

FIG. 3 is a diagram illustrating an arrangement example of the display apparatus 20A included in the side-view mirror unit 3A. The display apparatus 20A is placed inside the vehicle (for example, on the side of the driver's seat). Specifically, a display device 83 included in the display apparatus 20A is, as illustrated in FIG. 3, installed near the lower end portion of an A-pillar AP. The A-pillar AP is between a windshield FG and a side glass SG. The display apparatus 20B is installed at a position opposite to the display apparatus 20A in the horizontal direction with respect to the driver's seat including a steering wheel HN. The display apparatuses 20A and 20B mainly display images indicating conditions of the vehicle body BO on the respective sides. That is, the side-view mirror units 3A and 3B can be used for checking the conditions outside the vehicle on the respective sides that have conventionally been checked with the door mirrors or fender mirrors. The display apparatus 20C is arranged at a position where a rear-view mirror has been provided in a conventional automobile, so as to substitute for the rear-view mirror, for example. That is, the rear-view mirror unit 2 can be used for checking the conditions rearward outside the vehicle that have conventionally been checked with the rear-view mirror.

The display system 1 further includes a second sensor 82 configured to detect vibration at or near the display apparatus 20. Specifically, as illustrated in FIG. 3, the display apparatus 20A includes a second sensor 82A, for example. The second sensor 82A is provided on the opposite side of a display surface of the display apparatus 20A. The opposite side of the display surface is an example of a position that is within the housing of the display apparatus 20A and has no effect on the display output by the display apparatus 20A. The other display apparatuses 20B, 20C, and 20D also include corresponding second sensors in a similar manner. When the respective second sensors including the second sensor 82A individually provided at the display apparatuses 20A, 20B, 20C, and 20D are not distinguished specifically, they may be described as the second sensor 82.

The CID unit 4 includes a central processor 14 and the display apparatus 20D, for example. The display apparatus 20D is installed in a dashboard, for example. The display apparatus 20D displays route guidance information and others in a car navigation system. The display apparatus 20D of the CID unit 4 may display information similar to that indicated by a speedometer, a tachometer, a fuel gauge, a water temperature gauge, a distance meter, and others.

The CID unit 4 in the embodiment is coupled with the rear-view mirror unit 2 and the side-view mirror units 3A and 3B to perform data transmission. Specifically, the CID unit 4 is coupled with the rear-view mirror unit 2 and the side-view mirror units 3A and 3B via an interface such as high-definition multimedia interface (HDMI) (registered trademark), for example. This coupling form is an example of a coupling form between the CID unit 4 and the rear-view mirror unit 2 and between the CID unit 4 and the side-view mirror units 3A and 3B. However, the embodiment is not limited thereto, and can be modified as appropriate. When any one of the display apparatuses 20A, 20B, and 20C malfunctions, the display apparatus 20D performs display output as a substitute for the malfunctioning display apparatus. The central processor 14 carries out a variety of processing concerning the display output of the display apparatus 20D.

As in the description of the imaging apparatuses 5A, 5B, and 5C, the display apparatuses 20A, 20B, 20C, and 20D, and the first sensors 72A, 72B, and 72C, the uppercase letters appended to the numerals of the reference signs are used for the purpose of distinguishing the arrangement positions in the vehicle, and there is no particular difference in specific configurations.

Figure 4:
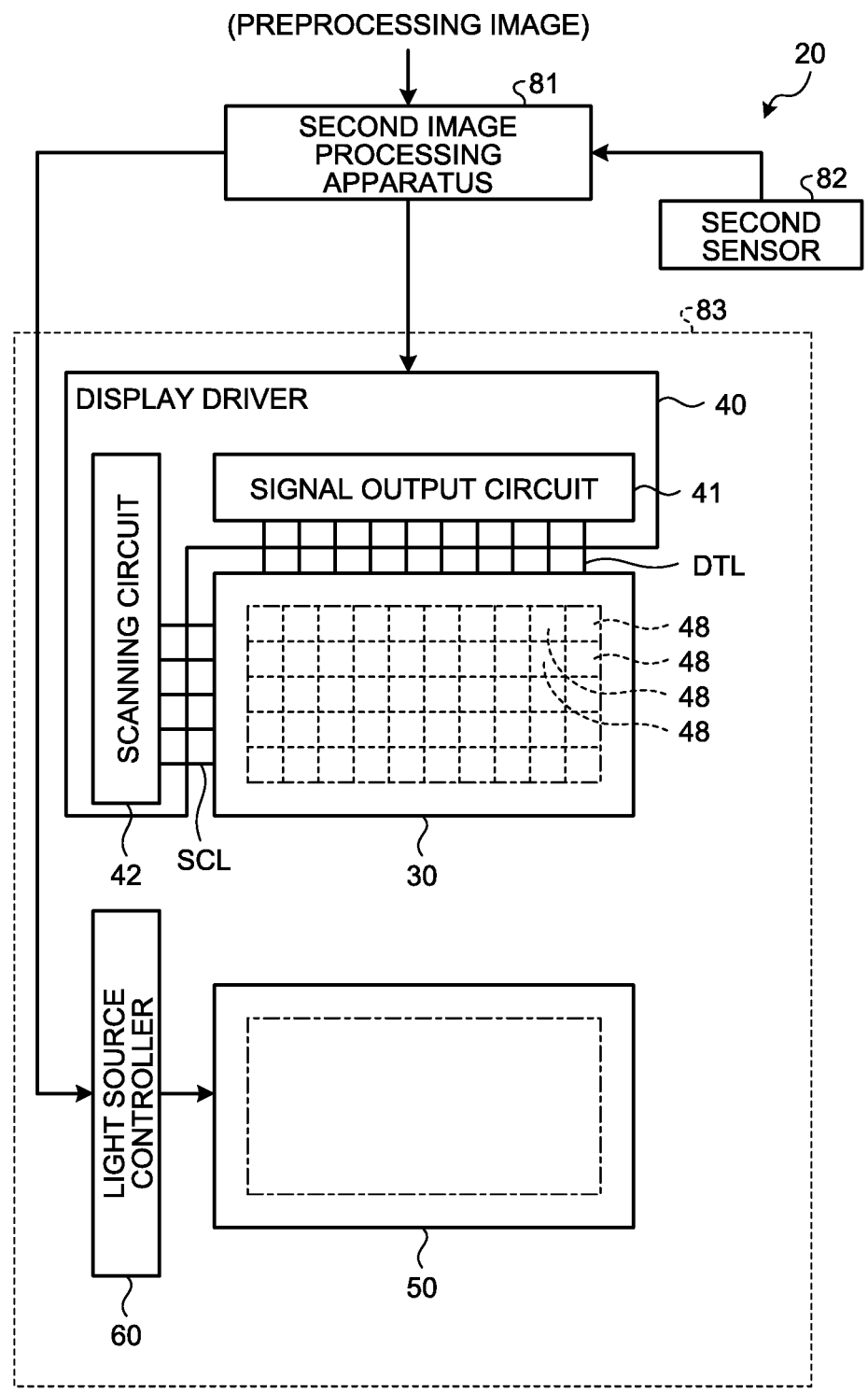
FIG. 4 is a block diagram illustrating a configuration example of the display apparatus.

FIG. 4 is a block diagram illustrating a configuration example of the display apparatus 20. As illustrated in FIG. 4, the display apparatus 20 includes a second image processing apparatus 81, the second sensor 82, and a display device 83. The display device 83 includes a display panel 30, a display driver 40, a light source 50, and a light source controller 60. The display panel 30 displays an image based on a signal (output signal) that is generated based on a post-processing image 93 (refer to FIG. 8, for example) by the second image processing apparatus 81. The display driver 40 controls driving of the display panel 30. The light source 50 illuminates the display panel 30 from its back surface, for example. The light source controller 60 controls driving of the light source 50. The second image processing apparatus 81 (refer to FIG. 4 and other figures), the post-processing image 93 (refer to FIG. 8 and other figures), and the second sensor 82 (refer to FIG. 4 and other figures) will be described later.

The display panel 30 includes $P_0 \times Q_0$ pixels 48 ($P_0$ pixels in a row direction by $Q_0$ pixels in a column direction) arrayed in a two-dimensional matrix (column-row configuration), for example. In this example, the row direction is an X direction, and the column direction is a Y direction. The direction orthogonal to the two directions of X and Y is a Z direction.

The display apparatus 20 is, more specifically, a transmissive color liquid-crystal display apparatus, for example. The pixel 48 includes sub-pixels of a plurality of colors for performing color display output. For example, the pixel 48 includes sub-pixels of red (R), green (G), and blue (B), and performs color display output in accordance with gradation values of the respective sub-pixels. The pixel 48 may include sub-pixels of other colors. For example, it may include sub-pixels of any one or a plurality of complementary colors, such as cyan (C), magenta (M), and yellow (Y), of the primary colors (RGB). The pixel 48 may include a sub-pixel of higher luminance, such as white (W), than the primary colors (RGB).

The display driver 40 includes a signal output circuit 41 and a scanning circuit 42. The signal output circuit 41 is a source driver, and generates a video signal for driving the pixels 48 in accordance with the signal output from the second image processing apparatus 81. The signal output circuit 41 of the display driver 40 retains the video signals and outputs them in sequence to the display panel 30. The signal output circuit 41 is electrically coupled to the display panel 30 via wiring DTL. The pixel 48 includes a plurality of sub-pixels, and operates such that the sub-pixels transmit light corresponding to the video signal. The scanning circuit 42 is a gate driver, and outputs a scanning signal corresponding to the pixel row indicated by the signal output from the second image processing apparatus 81. In the display driver 40, the scanning circuit 42 outputs the scanning signal to control turning on and off of switching elements (for example, thin-film transistors (TFT)) for controlling the operation (for example, display luminance, and in this case, the light transmittance) of the sub-pixels in the display panel 30. The scanning circuit 42 is electrically coupled to the display panel 30 via scanning lines SCL. The scanning circuit 42 turns the switching elements on and off via the scanning lines SCL. Accordingly, the switching elements are turned on and off in units of pixel lines (rows) provided along the scanning line. As just described, the display apparatus 20 can control turning on and off of the display output in units of lines.

The light source 50 is arranged on the back surface side of the display panel 30. The light source 50 functions as a backlight and illuminates the display panel 30 by emitting light toward the display panel 30. The light source 50 may be a front-light arranged on the front surface side of the display panel 30. When the display panel 30 is a self-luminous display device, such as an organic light emitting diode (OLED) display device, the light source 50 is not required.

The light source 50 irradiates the entire surface of the display panel 30 with light, thereby illuminating the display panel 30. The light source controller 60 controls the quantity of irradiation light or the like output from the light source 50. Specifically, the light source controller 60 adjusts a duty ratio of the current, the voltage, or the signal to be supplied to the light source 50 based on a light-source control signal output from the second image processing apparatus 81, thereby controlling the quantity of irradiation light (intensity of light) irradiating the display panel 30.

The following describes the side-view mirror unit 3A as an example of a combination of a single imaging apparatus 5 and a single display apparatus 20, more specifically.

Figure 5:
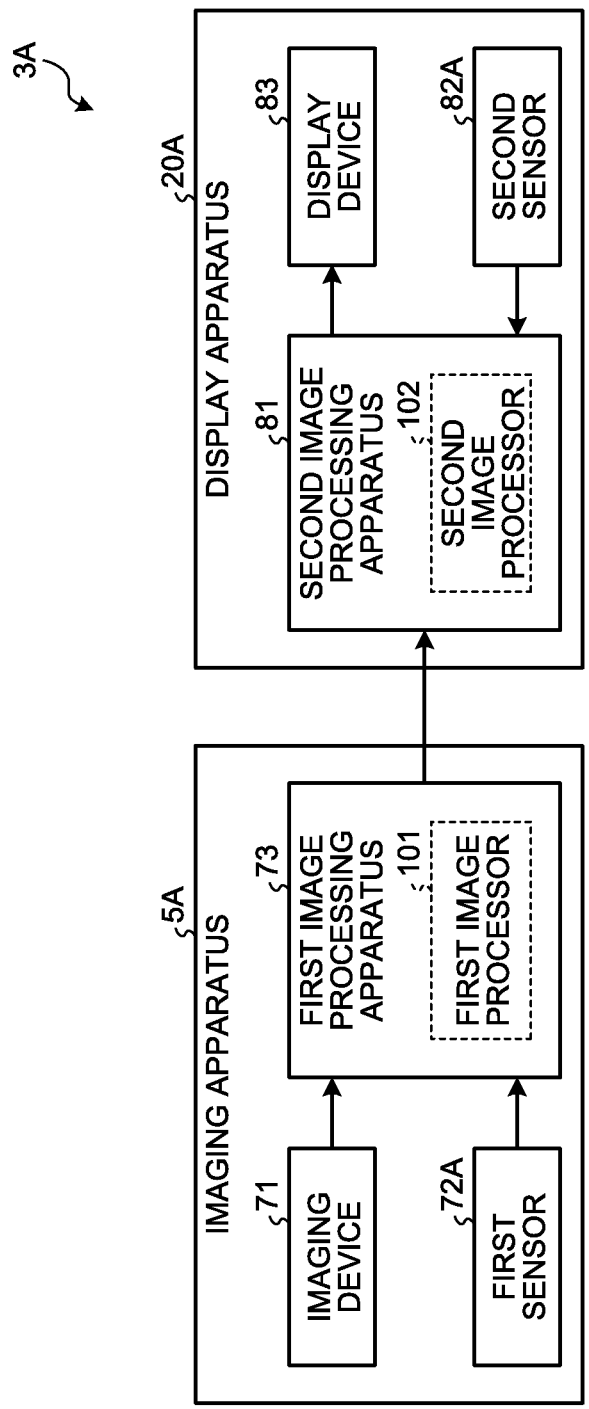
FIG. 5 is a block diagram illustrating a main configuration of the side-view mirror unit.

FIG. 5 is a block diagram illustrating a main configuration of the side-view mirror unit 3A. As illustrated in FIG. 5, the imaging apparatus 5A includes the imaging device 71, the first sensor 72A, and a first image processing apparatus 73. The display apparatus 20A, as described with reference to FIG. 4, includes the second image processing apparatus 81, the second sensor 82A, and the display device 83.

The imaging device 71 is installed on the vehicle and captures an image (refer to FIG. 2). Specifically, the imaging device 71 is a digital camera, and includes an image sensor, a lens, and a circuit that generates an image composed of a plurality of pixels aligned along the X and the Y directions based on electrical charges output from the image sensor. The image sensor is a complementary metal-oxide semiconductor (CMOS) image sensor or a charge coupled device (CCD) image sensor, for example. Other than these sensors, the image sensor may be an image sensor outputting electrical charges used for generating a two-dimensional image. The imaging device 71 captures an image at a certain frame rate, and outputs it as a captured image 91 (refer to FIG. 6). While the certain frame rate is any desired rate, examples thereof include, but are not limited to, 60 frame per second (fps), 120 fps, and others. In the following description, a two-dimensional plane on which the image sensor detects light may be described as an x-y plane, two directions that lie along the x-y plane and are orthogonal to each other may be described as x and y directions, and one direction (direction along a depth direction of capturing an image) orthogonal to the x and the y directions may be described as a z direction.

The first sensor 72 detects vibration at or near the imaging apparatus 5. For example, the first sensor 72A includes an accelerometer capable of detecting acceleration in at least the two x and y directions, out of the three x, y, and z directions, based on the image sensor of the imaging device 71 installed on the imaging apparatus 5A. The first sensor 72A detects the amount of vibration based on the acceleration detected by the accelerometer. Naturally, the first sensor 72A may be configured to detect acceleration in the three x, y, and z directions and detect the vibration amount in the respective directions based on the relevant acceleration. The first sensor 72, by being installed at or near the imaging apparatus 5 of the vehicle, that is, at a place nearer the imaging apparatus 5 than the display apparatus 20, detects the vibration that is exerted on the imaging apparatus 5 along with the traveling of the vehicle. The first sensor 72 may be present inside the housing of the imaging apparatus 5 as illustrated in FIG. 2, or may be installed near the imaging apparatus 5.

The first image processing apparatus 73 is a circuit that generates and outputs a preprocessing image 92 (refer to FIG. 6, for example) based on the captured image 91 by the imaging apparatus 5. Specifically, the first image processing apparatus 73 of the imaging apparatus 5A functions as a first image processor 101 (refer to FIG. 5) that, based on the detection result of the first sensor 72A, clips out the preprocessing image 92 to be smaller than the captured image 91, from the captured image 91. In the embodiment, the first image processing apparatus 73 is a circuit that is present inside the housing of the imaging apparatus 5. The first image processing apparatus 73 may be an external circuit that performs processing on an image signal output from the imaging apparatus 5 and outputs it downstream (to the display apparatus 20). The downstream is to mean a receiving side in transmitting and receiving data. In this case, the transmitting side is upstream. The function of the first image processor 101 will be described later.

The second sensor 82 detects vibration at or near the display apparatus 20. For example, the second sensor 82A includes an accelerometer capable of detecting acceleration in at least the two X and Y directions, out of the three X, Y, and Z directions of the display device 83 installed on the display apparatus 20A. The second sensor 82A detects the amount of vibration based on the acceleration detected by the accelerometer. Naturally, the second sensor 82A may be configured to detect acceleration in the three X, Y, and Z directions and detect the vibration amount in the respective directions based on the relevant acceleration. The second sensor 82, by being installed at or near the display apparatus 20, that is, at a place nearer the display apparatus 20 than the imaging apparatus 5, detects the vibration that is exerted on the display apparatus 20 along with the traveling of the vehicle. The second sensor 82 may be present inside the housing of the display apparatus 20, or may be installed near the display apparatus 20.

The acceleration sensor included in either the first sensor 72 or the second sensor 82, or both may be a small sensor that is made by using a micro-electro-mechanical systems (MEMS) technology, for example. This makes it possible, as illustrated in FIGS. 2 and 3, to employ a configuration in which the acceleration sensors are built into both the imaging apparatus 5 and the display apparatus 20.

The second image processing apparatus 81 is a circuit that generates and outputs the post-processing image 93 based on the preprocessing image 92 output from the imaging apparatus 5. Specifically, the second image processing apparatus 81 of the display apparatus 20A functions as a second image processor 102 (refer to FIG. 5) that, based on the detection result of the second sensor 82A, clips out the post-processing image 93 to be smaller than the preprocessing image 92, from the preprocessing image 92. In the embodiment, the second image processing apparatus 81 is a circuit that is present inside the housing of the display apparatus 20. The second image processing apparatus 81 may be an external circuit that performs processing on a signal of the preprocessing image 92, which is input into the display apparatus 20, more upstream (toward the imaging apparatus 5) than the display apparatus 20. The function of the second image processor 102 will be described later. As described with reference to FIG. 4, the second image processing apparatus 81 in the embodiment further has a function of outputting signals (the output signal and the light source control signal) concerning the operation control of the display driver 40 and the light source controller 60. However, the circuit that functions as the second image processor 102 may be provided separately from the circuit that outputs the signals concerning the operation control of the display driver 40 and the light source controller 60.

The display apparatus 20 is installed at a position different from that of the imaging apparatus 5 in the vehicle (refer to FIG. 3). The display device 83 of the display apparatus 20 displays the post-processing image 93. The post-processing image 93 is generated and output based on the preprocessing image 92. The preprocessing image 92 is generated and output based on the captured image 91. Thus, the post-processing image 93 is an image that is based on the captured image 91 captured by the imaging apparatus 5. That is, the display apparatus 20 displays the post-processing image 93 based on the captured image 91 captured by the imaging apparatus 5.

Next, the first image processor 101 will be described. In clipping the preprocessing image 92 from the captured image 91, the first image processor 101 moves the clip-out region thereof in a direction to counteract the vibration at or near the imaging apparatus 5. Specifically, the first image processor 101 clips out, as the preprocessing image 92, a first region after having moved in accordance with first coordinates after correction, from the captured image 91. The first coordinates before correction are the coordinates (certain first coordinates) that are defined within the captured image 91 when the vehicle is standing still (speed zero). The first coordinates after correction are the first coordinates that have been corrected based on the direction and the amount of vibration detected by the first sensor 72A. The first region before moving is the first region that is defined by using the first coordinates before correction. The first region after having moved is the first region that is defined by using the first coordinates after correction.

Figure 6:
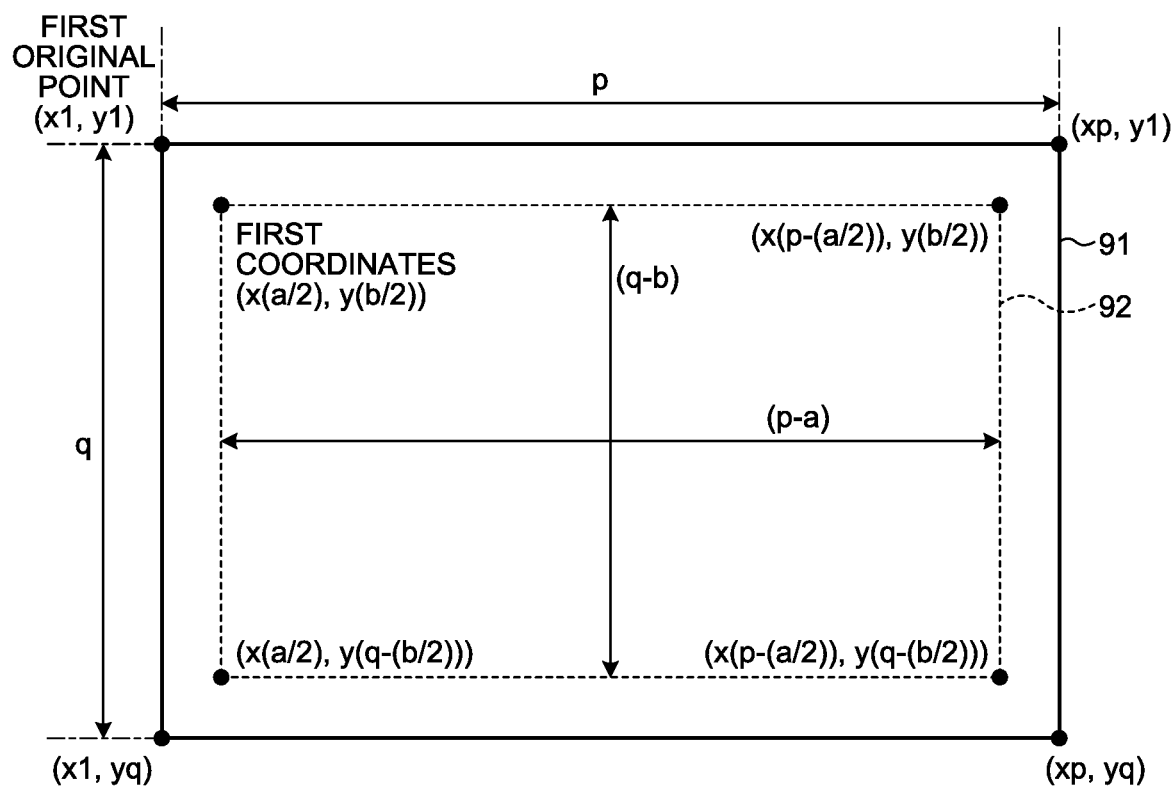
FIG. 6 is a diagram illustrating an example of the relation between a captured image and a preprocessing image.

FIG. 6 is a diagram illustrating an example of the relation between the captured image 91 and the preprocessing image 92. The captured image 91 is a two-dimensional image in which, with a first original point (x1,y1) as a start position, p pixels are lined up in the x direction and q pixels are lined up in the y direction. The coordinates of the first original point (x1,y1) are the coordinates of a pixel that is present at a certain position (for example, the upper left) of the captured image 91. The pixel region of the captured image 91 can be represented as a two-dimensional region extending from the coordinates of the first original point (x1,y1) to the coordinates (xp,yq) diagonal from the first original point. Here, "p" and "q" are integers.

The first image processor 101 defines a region to be clipped out from the captured image 91 as the preprocessing image 92, to be a two-dimensional region to be smaller than the pixel region of the captured image 91. Specifically, the first image processor 101 clips out, as the preprocessing image 92, a two-dimensional image having "a" fewer pixels in the x direction than the captured image 91 and "b" fewer pixels in the y direction than the captured image 91, from the captured image 91, for example, where "a" and "b" are integers.

The first image processor 101 in the embodiment, when the vehicle is standing still, obtains the preprocessing image 92 from the central portion in the captured image 91. Accordingly, when the vehicle is standing still, as illustrated in FIG. 6, the first image processor 101 handles a pixel region that extends from the coordinates $(x(a/2),y(b/2))$ to the coordinates $(x(p-(a/2)),y(q-(b/2)))$ within the captured image 91, as the first region defined by using certain first coordinates. The first image processor 101 clips out the first region as the preprocessing image 92. In this case, the coordinates $(x(a/2)),y(b/2))$ with respect to the coordinates (x1,y1) of the first original point are the certain first coordinates. As just described, the first coordinates (certain first coordinates) before correction are the coordinates that are defined within the captured image 91 when the vehicle is standing still.

In the description with reference to FIG. 6, the coordinates $(x(a/2),y(b/2))$ with respect to the coordinates (x1,y1) of the first original point are defined as the certain first coordinates, and a region including (p−a) pixels in the x direction from the first original point and (q−b) pixels in the y direction therefrom is clipped out as the preprocessing image 92. The embodiment, however, is not limited thereto, and it is possible to modify how to specifically set the clip-out region as the preprocessing image 92, as appropriate. For example, when "a" and "b" are odd numbers, the coordinates represented by (a/2) and (b/2) are no longer integers. Thus, by setting the certain first coordinates as $(x((a/2)\pm\frac{1}{2}),y((b/2)\pm\frac{1}{2}))$, the region to be clipped out as the preprocessing image 92 can be set appropriately. Note that "±" means either of plus (+) or minus (−).

Figure 7:
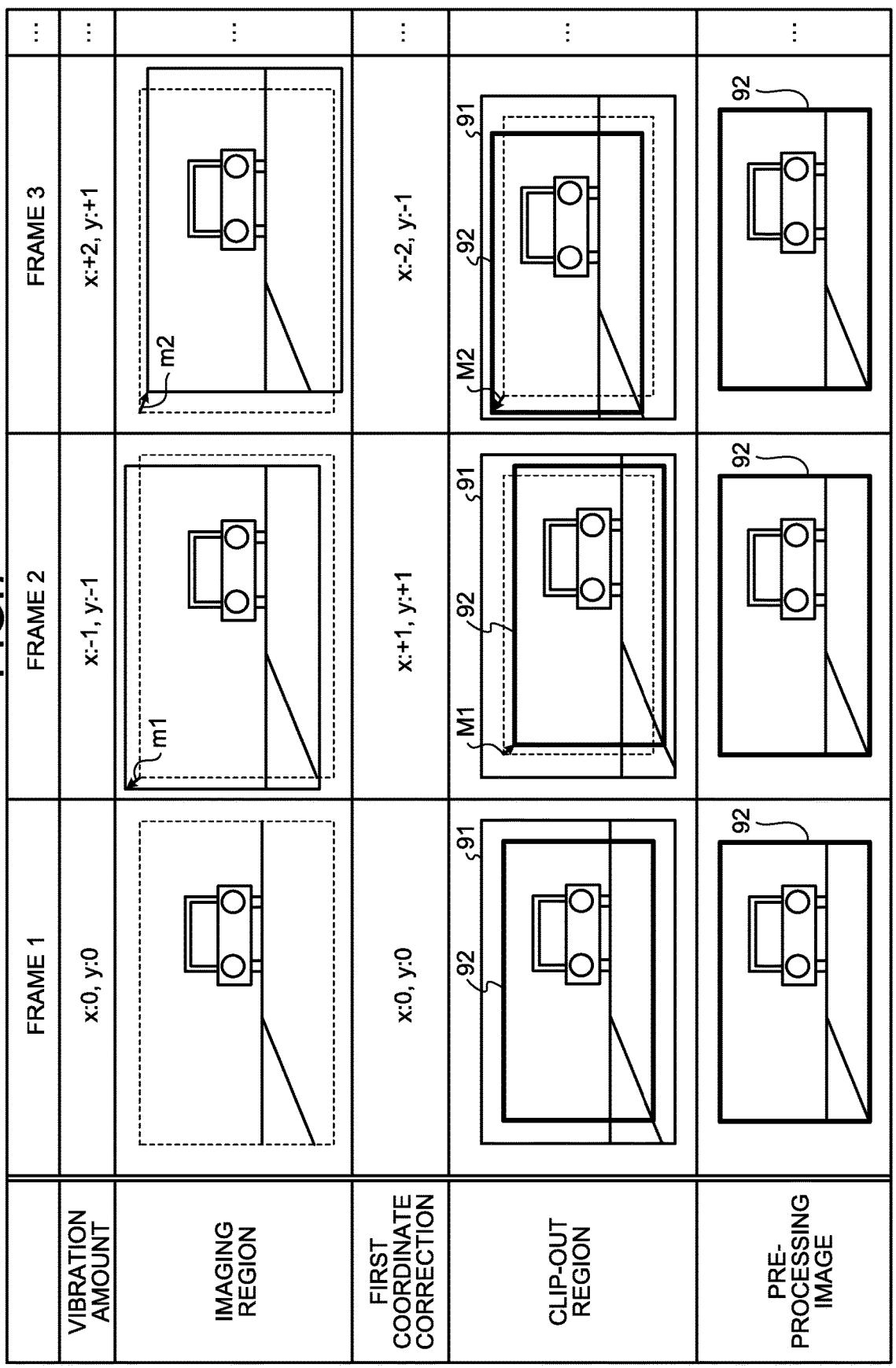
FIG. 7 is a diagram illustrating an example of the relation between vibration detected by a first sensor, variation in an imaging region due to the vibration exerted on the imaging apparatus, correction of first coordinates, variation in a clip-out region of a preprocessing image by the correction of the first coordinates, and the preprocessing image obtained by clipping.

FIG. 7 is a diagram illustrating an example of the relation between the vibration amount detected by the first sensor 72A, variation in the imaging region due to the vibration exerted on the imaging apparatus 5A, correction of the first coordinates, variation in the clip-out region of the preprocessing image 92 by the correction of the first coordinates, and the preprocessing image 92 obtained by clipping. In FIG. 7, the imaging region when the vehicle is standing still is represented by a broken line, and the imaging region after variation corresponding to the vibration exerted on the imaging apparatus 5A is represented by a solid line. The first sensor 72A detects the amount of vibration, which occurs at or near the imaging apparatus 5A along with the traveling of the vehicle, in the x and the y directions.

In "frame 1" of FIG. 7, the vehicle is standing still. In such a case, that is, in a case where the vibration amount is zero in both the x and the y directions, the first image processor 101 clips out the preprocessing image 92 without performing correction on the first coordinates. In other words, the first image processor 101 clips out the preprocessing image 92 from the captured image 91 by setting the correction amount (in the x and y directions) of the first coordinates as ±0. In this case, as described with reference to FIG. 6, the preprocessing image 92 is to be an image of the region extending from the coordinates (x(a/2),y(b/2)) to the coordinates (x(p−(a/2)),y(q−(b/2))) within the captured image 91.

Meanwhile, for the reasons that the vehicle is traveling and such, there are cases in which the vibration amount exceeding zero is detected by the first sensor 72A in at least one of the x and the y directions. For example, in the frames subsequent to "frame 2" in FIG. 7, the vehicle is traveling, and the vibration is occurring along with the traveling. In such a case, the first image processor 101 corrects the first coordinates based on the direction and the amount of the vibration detected by the first sensor 72A. The first image processor 101 clips out, as the preprocessing image 92, the first region after having moved in accordance with the first coordinates after correction, from the captured image 91.

For example, when the vibration amount is (x: −1, y: −1), that is, when the vibration amounts of −1 in the x direction and of −1 in the y direction are detected, the vibration causes the angle of view of the imaging apparatus 5A to be displaced toward the first original point by one pixel each in the x and the y directions. In this case, as illustrated in "frame 2" in FIG. 7, an imaging subject having been captured at the coordinates (x1,y1) of the first original point in a resting state of the vehicle is to be captured at the coordinates (x2,y2), and the imaging region moves in a direction of the arrow m1 from a position of the imaging region in "frame 1".

The first image processor 101 corrects the first coordinates to move the clip-out region of the preprocessing image 92 toward a direction opposite to the direction of displacement of the angle of view caused by the vibration. Specifically, the vibration amount is (x: −1, y: −1) in "frame 2" in FIG. 7, and thus one is added to each of the x coordinate and the y coordinate representing the first coordinates. Accordingly, the first coordinates in "frame 2" are corrected to be (x((a/2)+1),y((b/2)+1)). By the correction, the first coordinates move in a direction of the arrow M1, and the clip-out region also moves along with the correction of the first coordinates. The first image processor 101 clips out the region extending from the coordinates (x((a/2)+1),y((b/2)+1)) to the coordinates (x(p−(a/2)+1),y(q−(b/2)+1)), as the preprocessing image 92.

When the vibration amount is (x: +2, y: +1), that is, when the vibration amounts of +2 in the x direction and of +1 in the y direction are detected, the vibration causes the angle of view of the imaging apparatus 5A to be displaced toward the opposite corner of the first original point by two pixels in the x direction and one pixel in the y direction. In this case, as illustrated in "frame 3" in FIG. 7, the imaging subject having been captured at the coordinates (x1,y1) of the first original point in a resting state of the vehicle is outside of the imaging region. Thus, the imaging subject having been captured at the coordinates (x3,y2) in the resting state of the vehicle is to be captured at the first original point, and the imaging region moves in a direction of the arrow m2 from the position of the imaging region in "frame 1". The first image processor 101 corrects the first coordinates to move the clip-out region of the preprocessing image 92 in a direction opposite to the direction of displacement of the angle of view caused by the vibration. Specifically, the vibration amount is (x: +2, y: +1) in "frame 3" in FIG. 7, and therefore two is subtracted from the x coordinate of the first coordinates and one is subtracted from the y coordinate thereof. Accordingly, the first coordinates in "frame 3" are corrected to be (x((a/2)−2),y((b/2)−1)). By the correction, the first coordinates move in a direction of the arrow M2, and the clip-out region also moves along with the correction of the first coordinates. The first image processor 101 clips out the region extending from the coordinates (x((a/2)−2), y((b/2)−1)) to the coordinates (x(p−(a/2)−2),y(q−(b/2)−1)), as the preprocessing image 92.

The first coordinates are corrected toward the direction opposite to the direction of displacement of the angle of view caused by the vibration, and the preprocessing image 92 is clipped out based on the corrected first coordinates. Accordingly, as illustrated in "preprocessing image 92" in "frame 2" and "frame 3" in FIG. 7, the imaging regions that are clipped out as the preprocessing image 92 become identical to the imaging region of "frame 1" that is clipped out as the preprocessing image 92 when the vehicle is standing still. That is, as in the description with reference to FIG. 7, the first image processor 101 moves the clip-out region of the preprocessing image 92 within the captured image 91 in the direction to counteract the vibration at or near the imaging apparatus 5A, thereby making it possible to restrain the blurring from occurring on the preprocessing image 92 if the vibration occurs at or near the imaging apparatus 5A.

Not limited to the examples illustrated in "frame 1" to "frame 3" in FIG. 7, the first image processor 101 moves the first region in accordance with the first coordinates corrected based on the direction and the amount of the vibration detected by the first sensor 72A by a similar mechanism. Then, the first region after the movement is clipped out from the captured image 91 as the preprocessing image 92.

In the description with reference to FIG. 7, it is assumed that minus (−) represents the vibration amount when the imaging apparatus 5A is vibrating to displace the angle of view toward the first original point as viewed from the center of the captured image 91, and it is assumed that plus (+) represents the vibration amount when the imaging apparatus 5A is vibrating to displace the angle of view toward the opposite corner of the first original point as viewed from the center of the captured image 91. This is an example of the method of managing the vibration amount. However, the embodiment is not limited thereto, and the method can be modified as appropriate.

Next, the second image processor 102 will be described. The second image processor 102 causes the clip-out region of the post-processing image 93 within the preprocessing image 92 to follow the vibration at or near the display apparatus 20A. Specifically, the second image processor 102 clips out, as the post-processing image 93, a second region after having moved in accordance with second coordinates after correction, from the preprocessing image 92. The second coordinates before correction are the coordinates (certain second coordinates) that are defined within the preprocessing image 92 when the vehicle is standing still. The second coordinates after correction are the second coordinates that have been corrected based on the direction and the amount of vibration detected by the second sensor 82A. The second region before moving is the second region that is defined by using the second coordinates before correction. The second region after having moved is the second region that is defined by using the second coordinates after correction.

Figure 8:
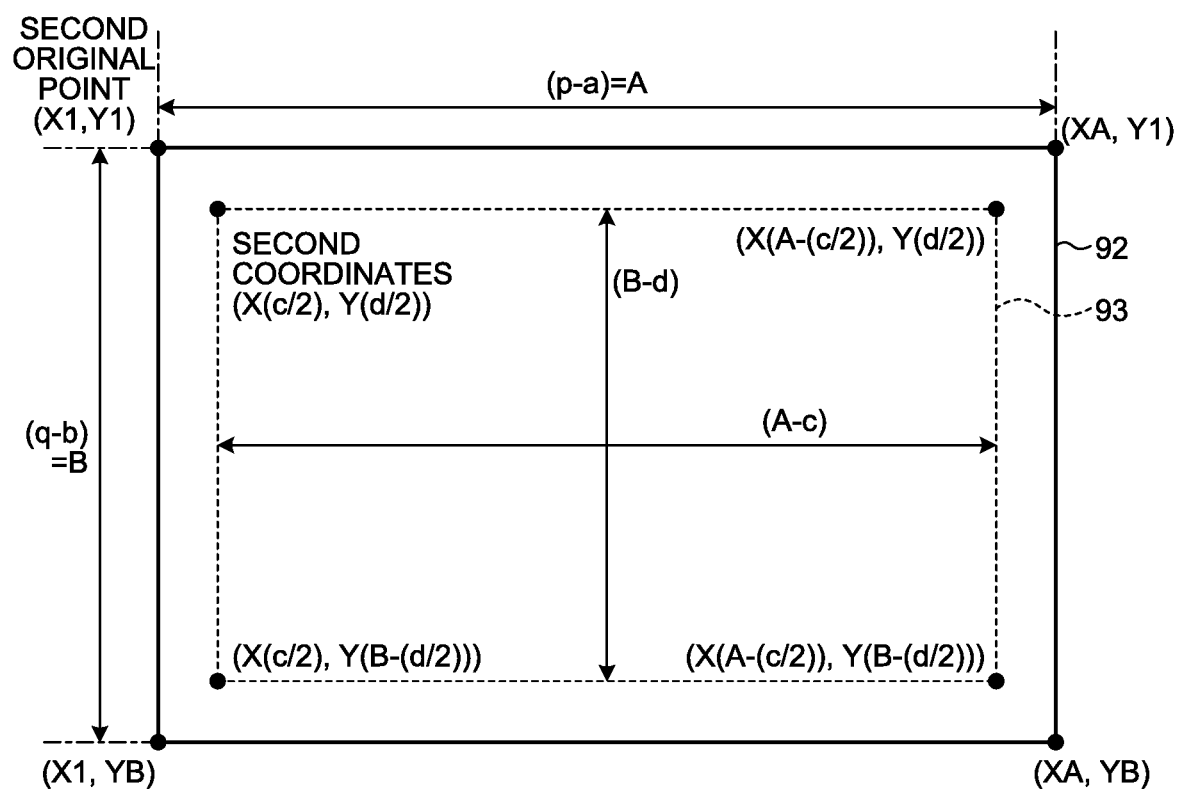
FIG. 8 is a diagram illustrating an example of the relation between a preprocessing image and a post-processing image.

FIG. 8 is a diagram illustrating an example of the relation between the preprocessing image 92 and the post-processing image 93. The preprocessing image 92 is a two-dimensional image in which, with a second original point (X1,Y1) as a start position, "A" pixels are lined up in the X direction and "B" pixels are lined up in the Y direction. The coordinates of the second original point (X1,Y1) are the coordinates of a pixel that is present at a certain position (for example, the upper left) of the preprocessing image 92. The pixel region of the preprocessing image 92 can be represented as a two-dimensional region extending from the coordinates of the second original point (X1,Y1) to the diagonal coordinates (XA,YB) of the second original point. Note that A=(p−a) and B=(q−b).

The second image processor 102 defines the region to be clipped out from the preprocessing image 92 as the post-processing image 93, to be a two-dimensional region to be smaller than the pixel region of the preprocessing image 92. Specifically, the second image processor 102 clips out, as the post-processing image 93, a two-dimensional image having "c" fewer pixels in the X direction than the preprocessing image 92 and "d" fewer pixels in the Y direction than the preprocessing image 92, for example, where "c" and "d" are integers.

The second image processor 102 in the embodiment, when the vehicle is standing still, obtains the post-processing image 93 from the central portion within the preprocessing image 92. Accordingly, when the vehicle is standing still, as illustrated in FIG. 8, the second image processor 102 handles a pixel region that extends from the coordinates (X(c/2),Y(d/2)) to the coordinates (X(A−(c/2)),Y(B−(d/2))) within the preprocessing image 92, as the second region defined by using certain second coordinates. The second image processor 102 clips out the second region as the post-processing image 93. In this case, the coordinates (X(c/2),Y(d/2)) with respect to the coordinates (X1,Y1) of the second original point are the certain second coordinates. As just described, the second coordinates (certain second coordinates) before correction are the coordinates that are defined within the preprocessing image 92 when the vehicle is standing still.

When the number of pixels in the X and the Y directions of the post-processing image 93 correspond to the resolution (P₀×Q₀) of the display panel 30, re-sampling concerning the display output is not required.

In the description with reference to FIG. 8, the coordinates (X(c/2),Y(d/2)) with respect to the coordinates (X1, Y1) of the second original point are defined as the certain second coordinates, and a region including (A−c) pixels in the X direction from the second original point and (B−d) pixels in the Y direction therefrom is defined as the post-processing image 93. The embodiment, however, is not limited thereto, and as with the case of the preprocessing image 92, it is possible to modify how to specifically set the post-processing image 93 to be clipped out from the preprocessing image 92, as appropriate.

Figure 9:
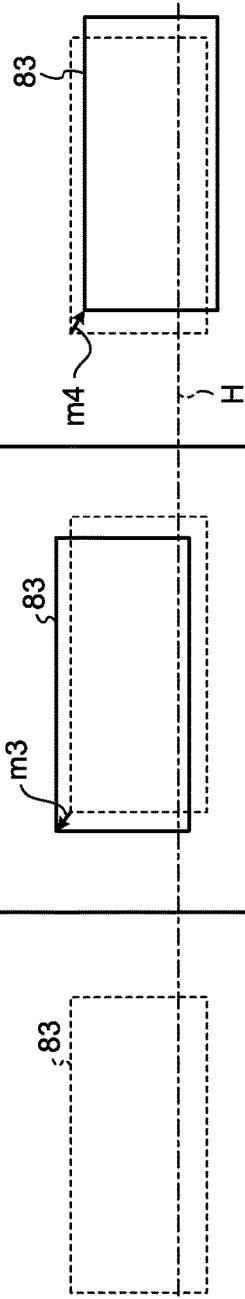
FIG. 9 is a diagram illustrating an example of the relation between vibration detected by a second sensor, variation in an image display position with respect to a horizontal line at a certain position due to the vibration exerted on the display apparatus, correction of second coordinates, variation in a clip-out region of a post-processing image caused by the correction of the second coordinates, and an output image displayed by the display apparatus with respect to the horizontal line at the certain position when the display apparatus displays the post-processing image.

FIG. 9 is a diagram illustrating an example of the relation between the vibration amount detected by the second sensor 82A, variation in an image display position with respect to a horizontal line H at a certain position due to the vibration exerted on the display apparatus 20A, correction of the second coordinates, variation in a clip-out region of the post-processing image 93 by the correction of the second coordinates, and the output image displayed by the display apparatus 20A with respect to the horizontal line H at the certain position when the display apparatus 20A displays the post-processing image 93. In FIG. 9, the position of the display device 83 when the vehicle is standing still is represented by a broken line, and the position of the display device 83 after variation corresponding to the vibration at or near the display apparatus 20A is represented by a solid line. The second sensor 82A detects the amount of vibration, which occurs at or near the display apparatus 20A along with the traveling of the vehicle, in the X and the Y directions.

In "frame 1" of FIG. 9, the vehicle is standing still. In such a case, that is, in a case where the vibration amount is zero in both the X and the Y directions, the second image processor 102 clips out the post-processing image 93 without performing correction on the second coordinates. In other words, the second image processor 102 clips out the post-processing image 93 from the preprocessing image 92 by setting the correction amount (in the X and Y directions) of the second coordinates as ±0. In this case, as described with reference to FIG. 8, the post-processing image 93 is an image of the region extending from the coordinates (X(c/2),Y(d/2)) to the coordinates (X(A−(c/2)),Y(B−(d/2))) within the preprocessing image 92.

Meanwhile, for the reasons that the vehicle is traveling and such, there are cases in which the vibration amount exceeding zero is detected by the second sensor 82A in at least one of the X and the Y directions. For example, in the frames subsequent to "frame 2" in FIG. 9, the vehicle is traveling, and the vibration is occurring along with the traveling. In such a case, the second image processor 102 corrects the second coordinates based on the direction and the amount of the vibration detected by the second sensor 82A. The second image processor 102 clips out, as the post-processing image 93, the second region after having moved in accordance with the second coordinates after correction, from the preprocessing image 92.

For example, when the vibration amount is (X: −1, Y: −1), that is, when the vibration amounts of −1 in the X direction and of −1 in the Y direction are detected, the vibration causes the position of the display device 83 to be displaced toward the second original point (the upper-left corner) of the display region by one pixel each in the X and the Y directions, and, the display apparatus moves in a direction of the arrow m3 from a position thereof in "frame 1".

The second image processor 102 corrects the second coordinates to move the clip-out region of the post-processing image 93 in the same direction as the direction of displacement of the angle of view caused by the vibration. Specifically, the vibration amount is (X: −1, Y: −1) in "frame 2" in FIG. 9, and thus one is subtracted from each of the X coordinate and the Y coordinate representing the second coordinates. Accordingly, the second coordinates in "frame 2" are corrected to be (X((c/2)−1),Y((d/2)−1)). By the correction, the second coordinates move in a direction of the arrow M3, and the clip-out region also moves along with the correction of the second coordinates. The second image processor 102 clips out the region extending from the coordinates (X((c/2)−1),Y((d/2)−1)) to the coordinates (X(A−(c/2)−1),Y(B−(d/2)−1)), as the post-processing image 93.

When the vibration amount is (X: +2, Y: +1), that is, when the vibration amounts of +2 in the X direction and of +1 in the Y direction are detected, the vibration causes the position of the display device 83 to be displaced toward the opposite corner (the lower-right corner) of the second original point by two pixels in the X direction and one pixel in the Y direction, and the display apparatus moves in a direction of the arrow m4 from the position thereof in "frame 1". The second image processor 102 corrects the second coordinates to move the clip-out region of the post-processing image 93 in the same direction as the direction of displacement of the angle of view caused by the vibration. Specifically, the vibration amount is (X: +2, Y: +1) in "frame 3" in FIG. 8, and therefore two is added to the X coordinate of the second coordinates and one is added to the Y coordinate thereof. Accordingly, the second coordinates in "frame 3" are corrected to be (X((c/2)+2),Y((b/2)+1)). By the correction, the second coordinates move in a direction of the arrow M4, and the clip-out region also moves along with the correction of the second coordinates. The second image processor 102 clips out the region extending from the coordinates (X((c/2)+2),Y((b/2)+1)) to the coordinates (X(A−(c/2)+2),Y(B−(d/2)+1)), as the post-processing image 93.

The second coordinates are corrected in the same direction as the direction of displacement of the angle of view caused by the vibration, and the clip-out region of the post-processing image 93 is made to move based on the corrected second coordinates. Thereafter, by clipping out the post-processing image 93, the imaging region, which is clipped out as the post-processing image 93, follows the vibration at or near the display apparatus 20A. As illustrated in "post-processing image 93" in "frame 2" and "frame 3" in FIG. 9, when the display apparatus 20A displays the post-processing image 93, the output image displayed by the display apparatus 20A does not move with respect to the horizontal line H of the certain position. That is, if the imaging region moves with respect to the horizontal line H of the certain position due to the vibration of the display apparatus 20A, the movement of the displayed output image is restrained. As in the description with reference to FIG. 9, the second image processor 102 causes the clip-out region of the post-processing image 93 within the preprocessing image 92 to follow the vibration at or near the display apparatus 20A, thereby making it possible to restrain the apparent movement when the vibration occurs at or near the display apparatus 20A.

Not limited to the examples illustrated in "frame 1" to "frame 3" in FIG. 9, the second image processor 102 corrects the second coordinates based on the direction and the amount of the vibration detected by the second sensor 82A by a similar mechanism, and clips out the second region, which has been moved by the correction of the second coordinates, from the preprocessing image 92 as the post-processing image 93.

In the description with reference to FIG. 9, it is assumed that minus (−) represents the vibration amount when the display apparatus 20A is vibrating to be displaced toward the second original point as viewed from the center of the display region, and it is assumed that plus (+) represents the vibration amount when the display apparatus 20A is vibrating to be displaced toward the opposite corner of the second original point as viewed from the center of the display region. This is an example of the method of managing the vibration amount. However, the embodiment is not limited thereto, and the method can be modified as appropriate.

Figure 10:
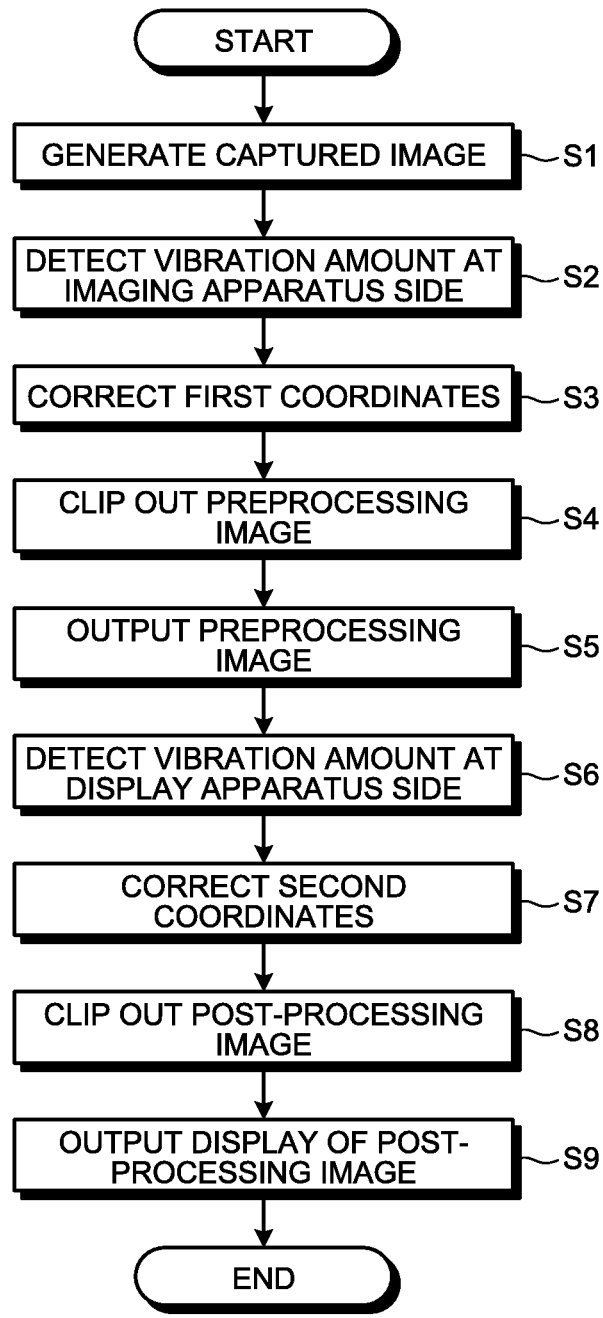
FIG. 10 is a flowchart illustrating an example of a sequence of image processing performed in the side-view mirror unit.

FIG. 10 is a flowchart illustrating an example of a sequence of image processing performed in the side-view mirror unit 3A. The imaging apparatus 5A causes the imaging device 71 to operate and generates the captured image 91 (Step S1). The first sensor 72A detects the amount of vibration at or near the imaging apparatus 5A (Step S2). The processing at Step S1 and the processing at Step S2 are performed in parallel.

The first image processing apparatus 73 functioning as the first image processor 101 corrects the first coordinates to move the clip-out region of the preprocessing image 92 in a direction to counteract the vibration at or near the imaging apparatus 5A (Step S3). The first image processing apparatus 73 employs the clip-out region of the preprocessing image 92 specified by the first coordinates after correction and clips out the preprocessing image 92 from the captured image 91 (Step S4). The first image processing apparatus 73 outputs the preprocessing image 92 to the display apparatus 20A (Step S5).

The second sensor 82A detects the amount of vibration at or near the display apparatus 20A (Step S6). The second image processing apparatus 81 functioning as the second image processor 102 corrects the second coordinates to cause the clip-out region of the post-processing image 93 to follow the vibration at or near the display apparatus 20A (Step S7). The second image processing apparatus 81 employs the clip-out region of the post-processing image 93 specified by the second coordinates after correction and clips out the post-processing image 93 from the preprocessing image 92 (Step S8). The display apparatus 20A displays the post-processing image 93 (Step S9).

As in the foregoing, the embodiment has been described with the imaging apparatus 5A and the display apparatus 20A as an example. However, the imaging apparatus 5B and the display apparatus 20B and also the imaging apparatus 5C and the display apparatus 20C are the same as the imaging apparatus 5A and the display apparatus 20A. That is, each of the side-view mirror units 3A and 3B and the rear-view mirror unit 2 includes the imaging apparatus 5, the display apparatus 20, the first sensor 72, the second sensor 82, the first image processor 101, and the second image processor 102. The imaging apparatus 5 is installed on the vehicle and includes the imaging device 71 that captures an image. The display apparatus 20 is installed at a position different from that of the imaging apparatus 5 in the vehicle and includes the display device 83 that displays the post-processing image 93 based on the captured image 91 captured by the imaging apparatus 5. The first sensor 72 is configured to detect vibration at or near the imaging apparatus 5. The second sensor 82 is configured to detect vibration at or near the display apparatus 20. The first image processor 101 clips out the preprocessing image 92 to be smaller than the captured image 91 from the captured image 91 based on the detection result of the first sensor 72. The second image processor 102 clips out the post-processing image 93 to be smaller than the preprocessing image 92 from the preprocessing image 92 based on the detection result of the second sensor 82. Each of the side-view mirror units 3A and 3B and the rear-view mirror unit 2 has the feature as a display system in which the first image processor 101 moves the clip-out region of the preprocessing image 92 within the captured image 91 in the direction to counteract the vibration at or near the imaging apparatus 5 and the second image processor 102 causes the clip-out region of the post-processing image 93 within the preprocessing image 92 to follow the vibration at or near the display apparatus 20.

In the description with reference to FIGS. 5 to 9, the coordinates are set for the image such that a pixel and a set of the coordinates correspond on a one-to-one basis. However, the method of setting the coordinates is not limited to this, and can be modified as appropriate. For example, based on a minimum unit of the resolution in the vibration amount detectable by the first sensor 72, a corresponding ratio between the minimum unit of the coordinates and the number of pixels may be set. Furthermore, for the purpose of bringing the minimum unit of the resolution in the vibration amount detectable by the first sensor 72 into correspondence with the number of pixels, the resolution conversion of the captured image 91 and the preprocessing image 92 may be performed.

The relation between the timing of sensing by the first sensor and the timing of sensing by the second sensor can be modified as appropriate. For example, as illustrated above with reference to FIG. 10, the first sensor 72 and the second sensor 82 may perform sensing at separate timings such that the first sensor 72 at or near the imaging apparatus operates in accordance with the timing of capturing an image and the second sensor 82 at or near the display apparatus operates in accordance with the timing of display output, or may perform sensing simultaneously.

Figure 11:
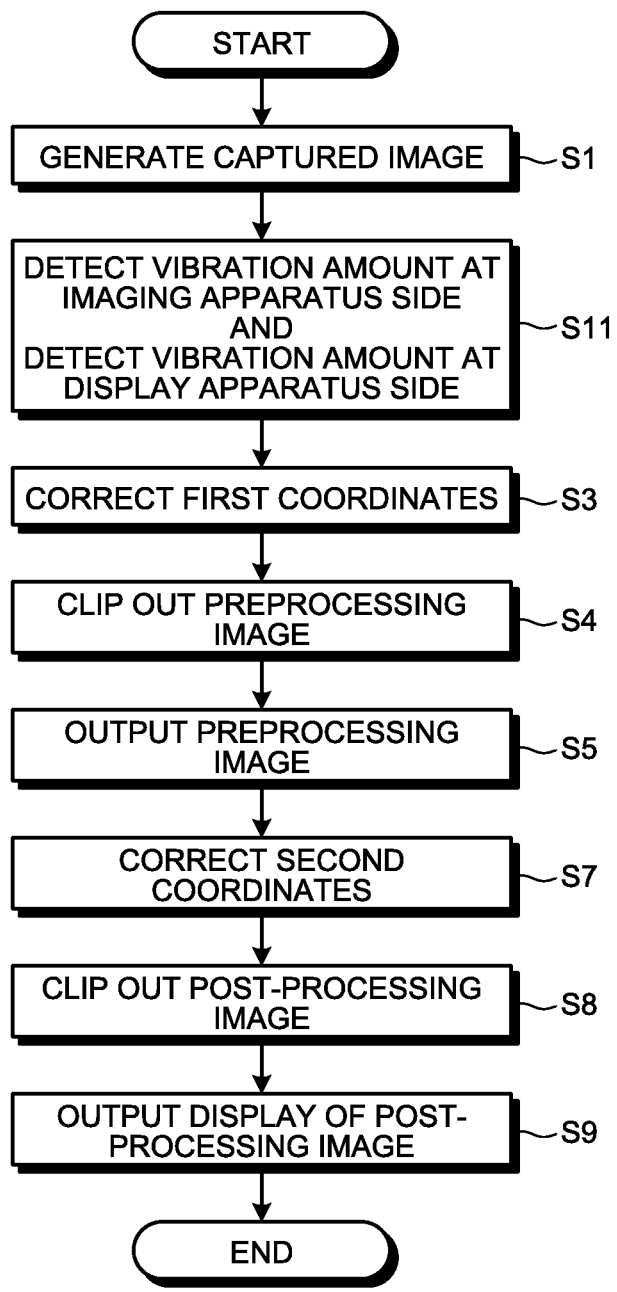
FIG. 11 is a flowchart illustrating an example of a sequence of processing performed in a case where the timing of sensing by the first sensor and the timing of sensing by the second sensor are simultaneous.

FIG. 11 is a flowchart illustrating an example of a sequence of processing performed in a case where the timing of sensing by the first sensor and the timing of sensing by the second sensor are simultaneous. As illustrated in FIG. 11 for example, the sensing by the first sensor 72 at or near the imaging apparatus and the sensing by the second sensor 82 at or near the display apparatus are carried out (Step S11) in parallel with the timing of capturing an image at Step S1. The processing illustrated in FIG. 11 is the same as the processing illustrated in FIG. 10, except for the points that the processing at Step S2 in FIG. 10 is replaced with the processing of Step S11 and the processing at Step S6 is omitted.

As in the foregoing, according to the embodiment, the first image processor 101 moves the clip-out region of the preprocessing image 92 within the captured image 91 in the direction to counteract the vibration at or near the imaging apparatus 5. Thus, if the vibration occurs at or near the imaging apparatus 5, it is possible to restrain the blurring from occurring on the preprocessing image 92. Furthermore, the second image processor 102 causes the clip-out region of the post-processing image 93 within the preprocessing image 92 to follow the vibration at or near the display apparatus 20. Thus, it is possible to restrain the apparent movement when the vibration occurs at or near the display apparatus 20. That is, by such processing of clipping out the preprocessing image 92 and such processing of clipping out the post-processing image 93, it is possible for a user to visually recognize an image in a state in which the blurring of the image due to the vibration exerted on each of the imaging apparatus 5 and the display apparatus 20 installed on the vehicle is reduced. Furthermore, it is possible to reduce the blurring of an image due to the vibration exerted on the display apparatus 20 installed on the vehicle on which the imaging apparatus 5 is installed.

The first image processor 101 clips out the preprocessing image 92 from the captured image 91 based on the first region defined by using the certain first coordinates within the captured image 91 when the vehicle is standing still. Specifically, the first image processor 101 changes the first coordinates and moves the first region based on the direction and the amount of vibration that is detected by the first sensor 72, and clips out the first region from the captured image 91 as the preprocessing image 92. The second image processor 102 clips out the post-processing image 93 from the preprocessing image 92 based on the second region defined by using the certain second coordinates within the preprocessing image 92 when the vehicle is standing still. Specifically, the second image processor 102 changes the second coordinates and moves the second region based on the direction and the amount of vibration that is detected by the second sensor 82, and clips out the second region from the preprocessing image 92 as the post-processing image 93. Thus, with respect to the images when the vehicle is standing still, it is possible to carry out the correction of the clip-out region for restraining the blurring of the image due to vibration.

The first image processing apparatus 73 functioning as the first image processor 101 is installed at or near the imaging apparatus 5, and the second image processing apparatus 81 functioning as the second image processor 102 is installed at or near the display apparatus 20. Accordingly, the processing for suppressing the influence due to the vibration that occurs at or near the imaging apparatus 5 and the processing for suppressing the influence due to the vibration that occurs at or near the display apparatus 20 can be performed independently, and therefore the processing load of the individual image processing apparatus can be reduced.

Modifications

Next, modifications of the embodiment will be described. In the description of the modifications, the configurations the same as those described in the embodiment above may be given the identical reference signs and the explanations thereof may be omitted.

Figure 12:
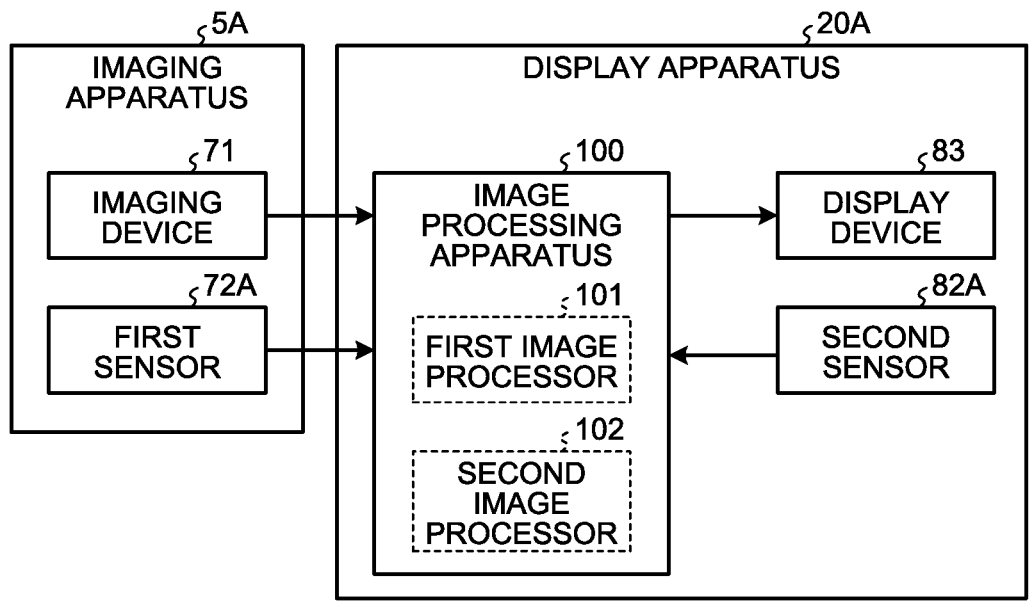
FIG. 12 is a block diagram illustrating a main configuration of a side-view mirror unit according to a modification.
Figure 13:
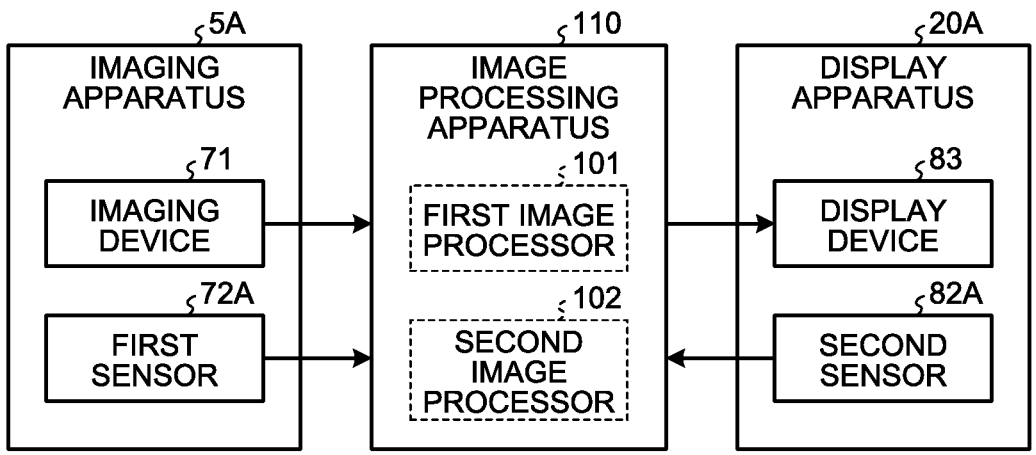
FIG. 13 is a block diagram illustrating another main configuration of the side-view mirror unit according to the modification.

FIGS. 12 and 13 are block diagrams illustrating main configurations of the side-view mirror unit 3A according to the modifications. For example, as illustrated in FIG. 12, an image processing apparatus 100 installed at or near the display apparatus 20A may function as the first image processor 101 and the second image processor 102. In this case, the first image processing apparatus 73 provided at or near the imaging apparatus 5A is not needed. Each of the first sensor 72A and the second sensor 82A outputs the detection result to the image processing apparatus 100. The imaging device 71 outputs the captured image 91 to the image processing apparatus 100. The image processing apparatus 100 functions as the first image processor 101 to clip out the preprocessing image 92 from the captured image 91, and functions as the second image processor 102 to clip out the post-processing image 93 from the preprocessing image 92. Furthermore, in FIG. 12, the display apparatus 20A includes the image processing apparatus 100 that functions as the first image processor 101 and the second image processor 102. However, the imaging apparatus 5A may, in place of the display apparatus 20A, include the image processing apparatus 100.

As illustrated in FIG. 13, an image processing apparatus 110 provided independently from the imaging apparatus 5A and the display apparatus 20A may function as the first image processor 101 and the second image processor 102. In this case, the first image processing apparatus 73 and the second image processing apparatus 81 in the embodiment are not needed. Each of the first sensor 72A and the second sensor 82A outputs the detection result to the independently provided image processing apparatus 110. The imaging device 71 outputs the captured image 91 to the independently provided image processing apparatus 110. The independently provided image processing apparatus 110 functions as the first image processor 101 to clip out the preprocessing image 92 from the captured image 91, and functions as the second image processor 102 to clip out the post-processing image 93 from the preprocessing image 92.

In the embodiment, the first image processing apparatus 73 at or near the imaging apparatus 5 clips out the preprocessing image 92 to be smaller than the captured image 91 from the captured image 91 based on the detection result of the first sensor 72. In the clipping process, the first image processing apparatus 73 moves the clip-out region of the preprocessing image 92 within the captured image 91 in the direction to counteract the vibration at or near the imaging apparatus 5, and thereby restraining the blurring of an image, the blurring being due to the vibration at or near the imaging apparatus 5. However, the blurring of the image due to the vibration at or near the imaging apparatus 5 may be restrained by other methods. For example, to restrain the blurring of the image due to the vibration at or near the imaging apparatus 5, an optical blurring correction function such as a lens shift system may be employed.

These modifications are not limited to the side-view mirror unit 3A, but are also applicable to the side-view mirror unit 3B and the rear-view mirror unit 2 in the same manner.

In the embodiment including the modifications, a liquid crystal display apparatus as an example of the display apparatus 20 has been exemplified. However, examples of the display apparatus 20 include all types of flat-panel display apparatuses such as an organic electroluminescence (EL) display apparatus and other light-emitting display apparatuses. Naturally, from medium-and-small size to large size, the embodiment is applicable to those sizes without limiting it particularly.

In the embodiment including the modifications, a vehicle as an example of the mobile body has been exemplified. The mobile body is not limited to an automobile having three or more wheels nor a body in which an occupant can sit on a seat provided in a cabin. The embodiment is applicable even to a two-wheeler including a body, and is applicable also to other mobile bodies such as a motorboat.

Furthermore, it is understood that, on the other operations and effects brought about by the forms described in the embodiment including the modifications, those apparent from the description in this specification or those that a person skilled in the art can easily perceive are naturally brought about by the present invention.

What is claimed is:

1. A display system comprising:
    an imaging apparatus installed on a mobile body and including an imaging device that captures an image;
    a display apparatus installed at a position different from that of the imaging apparatus on the mobile body and including a display device configured to display a post-processing image based on the image captured by the imaging apparatus;
    a first sensor configured to detect vibration at or near the imaging apparatus;
    a second sensor configured to detect vibration at or near the display apparatus;
    a first image processor configured to, based on a detection result of the first sensor, clip out a preprocessing image to be smaller than the captured image from the captured image; and
    a second image processor configured to, based on a detection result of the second sensor, clip out the post-processing image to be smaller than the preprocessing image from the preprocessing image,
    wherein the first image processor moves a clip-out region of the preprocessing image within the captured image in a direction to counteract vibration at or near the imaging apparatus,
    wherein the second image processor causes a clip-out region of the post-processing image within the preprocessing image to follow vibration at or near the display apparatus, and
    wherein the first sensor is installed at or near the imaging apparatus, and the second sensor is installed at or near the display apparatus.

2. The display system according to claim 1,
    wherein the second image processor clips out, based on a second region defined by using certain second coordinates within the preprocessing image, the second region that has been moved in accordance with the second coordinates corrected based on a direction and an amount of vibration detected by the second sensor, from the preprocessing image as the post-processing image.

3. The display system according to claim 2,
    wherein the second coordinates before correction are defined within the preprocessing image when the mobile body is standing still.

4. The display system according to claim 1,
    wherein the first image processor clips out, based on a first region defined by using certain first coordinates within the captured image, the first region that has been moved in accordance with the first coordinates corrected based on a direction and an amount of vibration detected by the first sensor, from the captured image as the preprocessing image.

5. The display system according to claim 4,
    wherein the first coordinates before correction are defined within the captured image when the mobile body is standing still.

6. The display system according to claim 1,
    wherein the first image processor and the second image processor are installed at or near the imaging apparatus, or at or near the display apparatus.

7. The display system according to claim 6,
    wherein the display apparatus includes the first image processor and the second image processor.

8. The display system according to claim 1,
    wherein the first image processor is installed at or near the imaging apparatus, and the second image processor is installed at or near the display apparatus.

9. The display system according to claim 1,
    wherein the mobile body is a vehicle.

10. A display apparatus installed on a mobile body, on which an imaging apparatus including an imaging device configured to capture an image is installed, at a position different from that of the imaging apparatus, the display apparatus comprising:
    a display device configured to display a post-processing image based on the image captured by the imaging apparatus; and
    an image processor configured to clip out a preprocessing image to be smaller than the captured image from the captured image based on a detection result of a first sensor configured to detect vibration at or near the imaging apparatus, and clip out the post-processing image to be smaller than the preprocessing image from the preprocessing image based on a detection result of a second sensor configured to detect vibration at or near the display apparatus,
    wherein the image processor moves a clip-out region of the preprocessing image within the captured image in a direction to counteract vibration at or near the imaging apparatus, and causes a clip-out region of the post-processing image within the preprocessing image to follow vibration at or near the display apparatus, and
    wherein the first sensor is installed at or near the imaging apparatus, and the second sensor is installed at or near the display apparatus.

11. An image processing apparatus configured to perform image processing for a mobile body on which an imaging apparatus and a display apparatus are installed, the imaging apparatus including an imaging device configured to capture an image, the display apparatus being installed at a position different from that of the imaging apparatus and including a display device configured to display a post-processing image based on the image captured by the imaging apparatus, the image processing apparatus comprising:
    an image processor configured to
        clip out a preprocessing image to be smaller than the captured image from the captured image based on a detection result of a first sensor configured to detect vibration at or near the imaging apparatus, and clip out the post-processing image to be smaller than the preprocessing image from the preprocessing image based on a detection result of a second sensor configured to detect vibration at or near the display apparatus, wherein the image processor moves a clip-out region of the preprocessing image within the captured image in a direction to counteract vibration at or near the imaging apparatus, and causes a clip-out region of the post-processing image within the preprocessing image to follow vibration at or near the display apparatus, and wherein the first sensor is installed at or near the imaging apparatus, and the second sensor is installed at or near the display apparatus.

\* \* \* \* \*